Jan. 24, 1928.
C. C. COLLETTE
1,657,068
UTENSIL HANDLE PROTECTOR
Filed Aug. 9, 1927
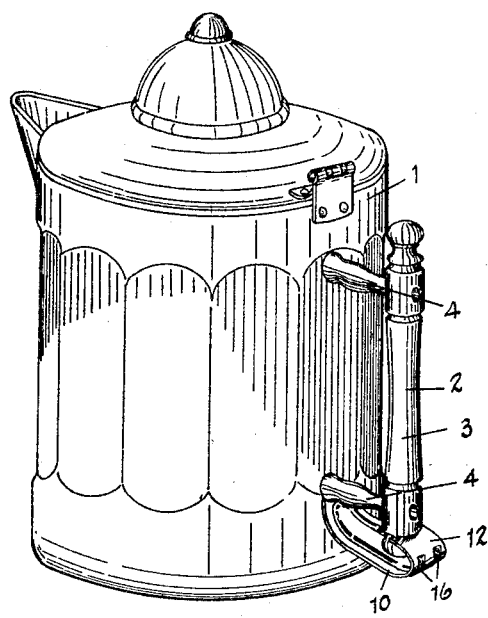
Fig 1
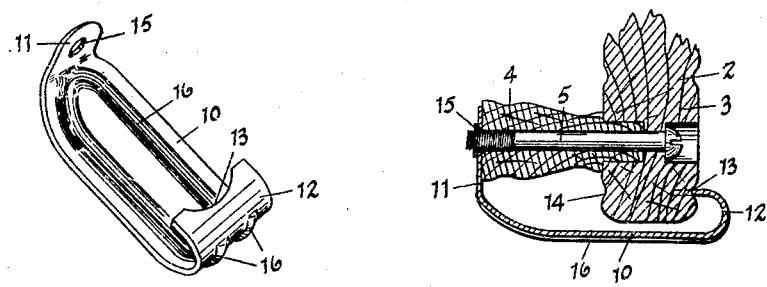
Fig 2
Fig 3
Inventor
Clarence C. Collette
By Faust F. Crampton.
Attorney Patented Jan. 24, 1928.

1,657,068

UNITED STATES PATENT OFFICE.

CLARENCE C. COLLETTE, OF AMSTERDAM, NEW YORK.

UTENSIL-HANDLE PROTECTOR.

Application filed August 9, 1927. Serial No. 211,730.

My invention has for its object to provide an efficient protector for handles of utensils commonly used for heating articles or materials. It particularly has for its object to prevent burning or decomposition of handles that are formed of heat insulating material, such as, wood, fibrous and plastic compositions. The invention provides a readily attachable and detachable plate extending beneath the handle and so as to deflect the heat laterally with respect to the handle at a point beneath the handle and thus prevent the deleterious effects of heat on the handle. More specifically, the invention provides a means for rigidly securing and mounting the protector at its ends so that, while it may be made of relative thin sheet material at a low cost of production, it will not be bent out of shape or distorted by the heat to which it may be subjected and also whereby its outer end, with reference to the handle, is securely fixed in its position, it also being so shaped and secured as to prevent ready engagement or interlocking with other objects.

Structures containing the invention may vary as to their details. To illustrate a practical application of the invention, I have selected a handle protector for coffee percolators as an example of the protectors of different forms that contain my invention, and shall describe it hereinafter. The particular handle protector referred to is shown in the accompanying drawing.

Fig. 1 illustrates a perspective view of a handle protector as applied to a coffee percolator. Fig. 2 is a perspective view of the protector itself. Fig. 3 is a view of a section taken through a part of the handle and also through the longitudinal axis of the protector.

The utensil 1 is provided with a handle 2 which is, preferably, formed of heat insulating material to prevent conductivity of the heat of the utensil and its contents to the handle and so that the utensil may be manipulated by an individual. The handle 2 may be secured to the utensil by any suitable means. Usually, such handles have vertical parts, such as, the part 3 and horizontally extending parts, such as, the parts 4, that interconnect the part 3 with the percolator and are secured by means of bolts 5. The protector is secured beneath the lower end of the handle by means of the bolt 5, and interlocking parts formed at the ends of the handle and the protector.

The protector 10 is formed of sheet metal. It has an upwardly projecting ear 11 that may be located intermediate the inner end of the part 4 and the wall of the utensil 1. The protector 10 also has a prominently looped or inwardly turned end portion 12 that is located on the outside of the vertical plane tangential to the outermost portion of the surface of the part 3 of the handle. The end edge of the inturned end portion 12 is curved as at 13 and the lower end of the part 2 of the handle has a groove 14 which may be so shaped as to be more or less decorative in its character. The edge 13 fits into the groove 14 and thus prevents displacement of the outer end portion of the protector. The dimensions of the protector are such that when the edge 13 is placed in the groove 14 the end of the ear 11 will be pressed with a considerable pressure against the inner end of the part 4 and as the ear 11 is pushed over the inner end surface of the part 4, the pressure by reason of the elasticity of the protector 10 will be increased while at the same time the pressure of the edge 13 against the bottom of the groove 14 will also be increased. The pressure of the end edge of the protector will be further increased when the bolt 5 is screwed down into position. The protector is thus placed in position by inserting the edge 13 in the groove 14 and then placing the end of the ear 11 on the inner end surface of the part 4 and with relatively considerable pressure pushing the ear 11 over the surface of the end of the part 4 until the opening 15 of the ear 11 is in line with the bolt 5, whereupon the bolt 5 may be inserted through the ear and thus locate the protector in position, whereby it will be rigidly secured at both ends.

In order to increase the rigidity of the protector, it is provided with beaded portions 16 that extend along its sides and edges from near the ear 11 to substantially a midpoint of the looped end portion 12, substantially as shown in Figs. 1 and 2. Thus by my invention I have provided a protector for handles that is rigidly connected at both ends of the protector and does not bodily project from the percolator and thus avoids interengagement or locking with other utensils or articles, and also is so constructed that it will not be bent or distorted in the ordinary use of the utensil.

I claim:

In a protector for handles of utensils, an elastic sheet metal part having an outer looped returned end portion and the handle having a groove for engaging the outer returned end of the sheet metal part, the other end of the sheet metal part having an ear for connecting the sheet metal part to the utensil, the distance between the ear and the said outer returned end of the said sheet metal part being such as to draw the said outer returned end into the groove and against the handle when the ear is secured to the utensil.

In witness whereof I have hereunto signed my name to this specification.

CLARENCE C. COLLETTE.